Figure 1:
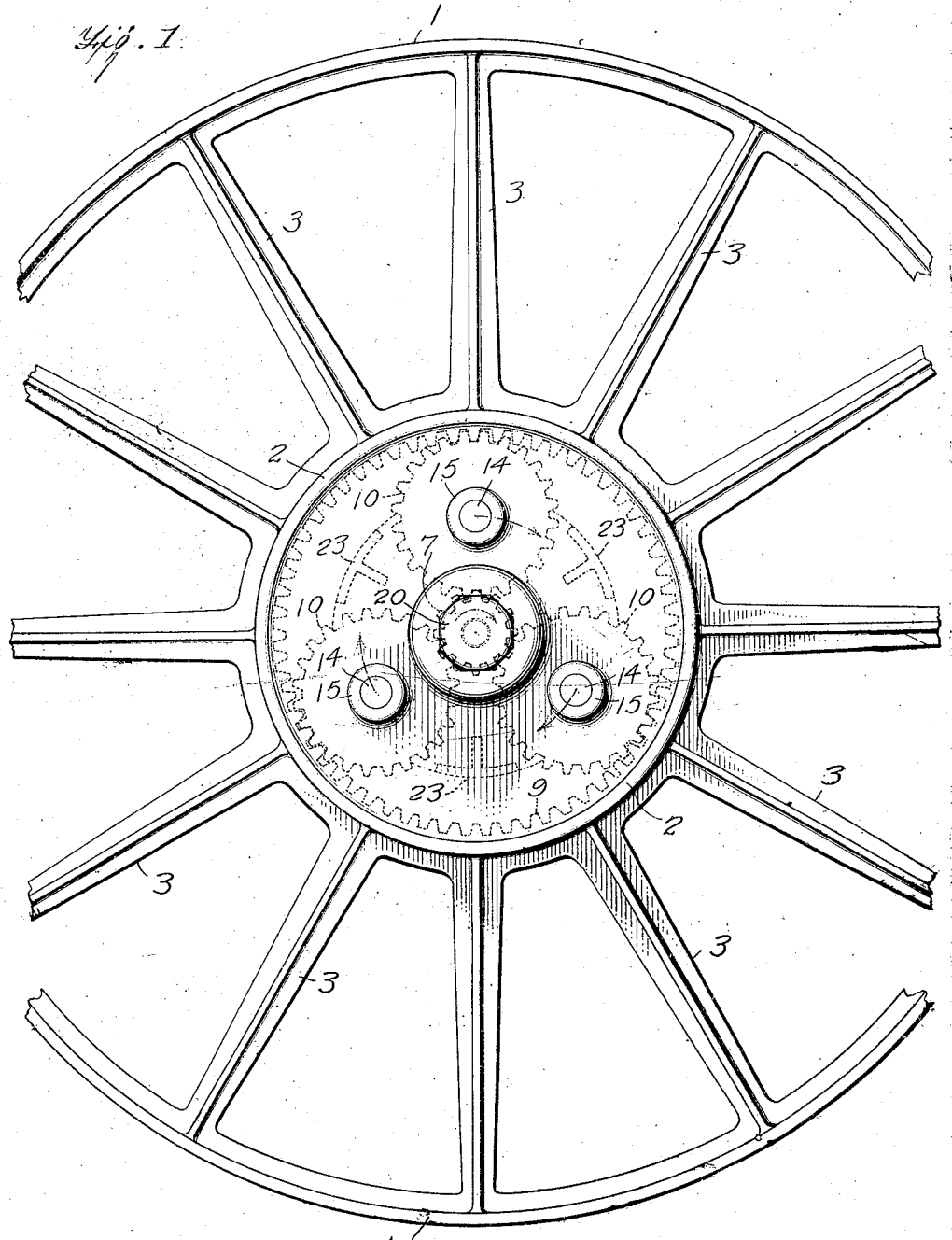

N. L. OLSON.
DRAFT WHEEL.
APPLICATION FILED OCT. 7, 1914.

1,151,381.

Patented Aug. 24, 1915.
2 SHEETS—SHEET 1.

WITNESSES

INVENTOR
NELS L. OLSON,
BY Munn & Co.
ATTORNEYS

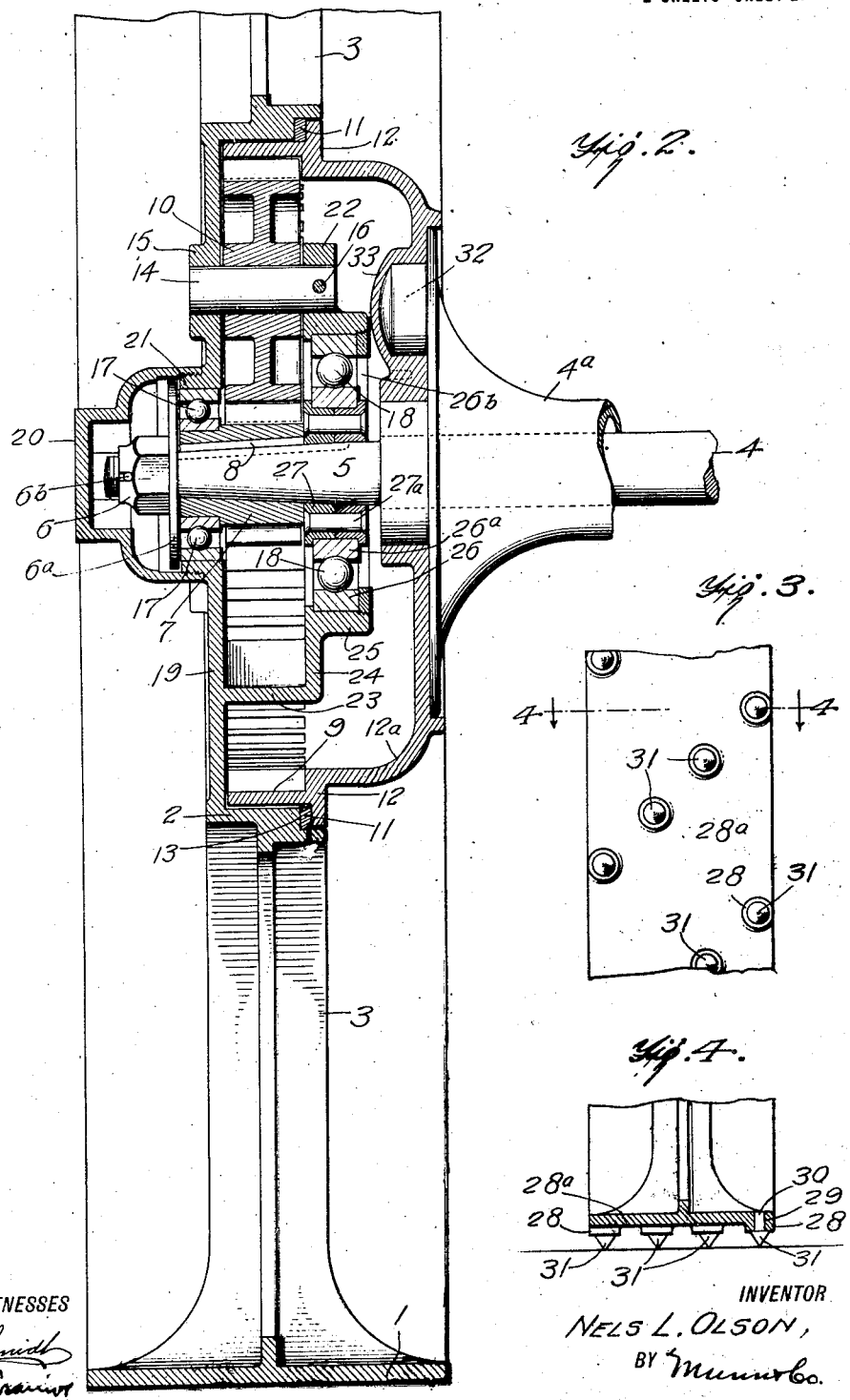

UNITED STATES PATENT OFFICE.

NELS LINER OLSON, OF HIGHLAND PARK, MICHIGAN.

DRAFT-WHEEL.

1,151,381.

Specification of Letters Patent.  Patented Aug. 24, 1915.

Application filed October 7, 1914. Serial No. 865,478.

*To all whom it may concern:*

Be it known that I, NELS LINER OLSON, a citizen of the United States, and a resident of Highland Park, in the county of Wayne and State of Michigan, have invented a new and useful Improvement in Draft-Wheels, of which the following is a specification.

My invention is an improvement in draft wheels, and has for its object to provide mechanism of the character specified, adapted to be quickly mounted on the rear axle of a motor car in place of the ordinary wheel, or to be demounted therefrom, and wherein the mechanism is so arranged that the power of the motor is transmitted to the wheel at a considerable reduction in speed, thereby increasing the tractive power of the motor and the vehicle in like proportions.

A further object of the invention is to provide a rim surface in connection with the wheel which will give the maximum of friction between the wheel and the supporting surface, and wherein the rim is arranged to receive detachable calks for use on icy or slippery roads.

In the drawings, Figure 1 is a front view of a wheel constructed in accordance with the invention, Fig. 2 is a vertical section through the driving mechanism, Fig. 3 is a partial plan view of a modified form of rim, and Fig. 4 is a section on the line 4—4 of Fig. 3 looking in the direction of the arrows adjacent to the line.

In the present embodiment of the invention, the wheel comprises a rim 1, an inner ring 2 co-axial therewith, and spokes 3 connecting the hub and the ring. The rear axle 4 is journaled in a housing $4^a$, and the axle has the usual spindles 5 at its ends, upon which the wheels are mounted. The spindle as shown is tapering or frusto-conical, and the outer end thereof is reduced and screw threaded to receive the nut 6 for holding the wheel on the spindle.

A pinion 7 is held on the spindle by a nut 6, and by a washer $6^a$, and the pinion is constrained to rotate with the spindle by a key or feather 8, the key engaging registering grooves in the spindle and the pinion. An internal gear ring 9 is connected to the housing $4^a$ in a manner to be presently described, and a series of pinions 10 is arranged between the gear ring and the pinion 7, for transmitting the movement of the said pinion to the wheel.

A bronze washer or bearing ring 11 is arranged between a radial rib 12 on a web $12^a$ integral with the gear ring, and an annular shoulder 13 formed by rabbeting the inner surface of the face of the ring 2, the said washer or ring 11 being provided for receiving the end thrust between the wheel and the housing for the axle.

The pinions 10 are mounted on journal pins 14 carried by the wheel, each of the journal pins being held in bearings 15 in a web 19 extending radially inward from the ring 2, and in bearings 22 in another web 24 supported by the web 19 in a manner to be presently described. Each bearing 15 is in register with a bearing 22 of the web 24, and the journal pins 14 are held from longitudinal movement in the bearings by means of cross pins 16 extending through the journal pins and the bearings 22.

Ball bearings 17 and 18 are arranged at the hub of the pinion 7, the bearings 17 being between the outer end of the hub of the pinion, and an annular flange 21 on the web 19, while the bearings 18 are between the inner end of the hub of the pinion and a marginal rib 25 on the web 24. The said web 24 is integrally connected to the web 19 by means of extensions 23 which are approximately T-shaped in cross section. The extensions 23 extend between adjacent pinions 10, so that they do not interfere with the movement of the said pinions. The wheel, the web 19, the web 24, and the extensions 23 constitute an integral structure, and because of this integral construction the relative position of the pinions 10 does not change with respect to the wheel, the webs and the extension.

A dust cap 20 is threaded on to a lateral annular flange 21 at the inner edge of the web 19, and the said cap incloses the outer end of the spindle, the nut 6, and the washer $6^a$, and the inner surface of the said web fits the outer surface of the cage of the bearing 17. The nut is locked from accidental rotation by means of a locking pin $6^b$.

At its inner edge the web 24 is provided with a marginal rib 25, extending toward the housing 4ª, and the inner face of the rib engages the outer surface of the cage of the ball bearing 18. The said cage consists of an outer member 26, and an inner member 26ª. The outer member is held in position by a locking ring 26ᵇ threaded into the rib 25, and the inner member 26ª is held in place by a sectional ring 27, whose sections are secured together by rivets 27ª.

It will be understood that the improved wheels are intended to replace the rear wheels of a motor vehicle and it will be obvious that when the spindles 5 are rotated, the pinions 7 will rotate with the spindles because of the key 8. Each pinion 7 will rotate forwardly, and the intermediate connecting pinions 10 will be rotated rearwardly. Since, however, the said pinions cannot move bodily with respect to the wheel, and since the gear ring 23 cannot move bodily because it is anchored by the housing 4ª, the pinions themselves will move bodily, driving the wheel forward, but at a decreased speed. Thus the power of the motor will be greatly multiplied. The ball bearings 17 and 18, as well as the thrust ring 11 greatly lessen the friction between the parts.

To remove the improved wheel it is only necessary to remove the dust cap 20, after which the nut 6 may be turned off, and when the washer 6ª is removed, the wheel may be slipped off the spindle. To replace the wheel a reversal of the above process is necessary.

It will be evident that any desired relation between the spindle and the wheel may be obtained, depending upon the power desired. The periphery or rim 28ª of the wheel may be provided with bosses 28, the bosses being arranged closely together as shown and preferably staggered. Preferably the rim of the wheel is provided with a radial opening 29 at each boss for receiving extensions 30 of pointed spurs or lugs 31.

With a pair of draft wheels as above described, any automobile may be easily and quickly transformed into a tractor which may be used with advantage for numerous purposes as for instance, plowing, mowing, trucking, or the like. The bosses 28 enter the supporting surface of the vehicle, thus insuring a firm, close grip of the wheel on the ground, and when the spurs are used, the grip is yet more firm.

The openings 29 are not necessarily threaded, since it is obvious that plain openings may be used, and the spurs may have plain extensions fitting the openings closely. The calks or spurs may be arranged to be removed when desired. It is obvious that instead of a solid steel rim provided with bosses as shown, a solid rubber tire may be used, this however, depending upon conditions.

The improved wheel may take the place of the usual wheel. When it is desired to increase the power applied to the wheel the usual wheel is removed and the cap 20 is removed from the improved wheel. The wheel is placed on the spindle, the spindle passing through the hub of the pinion 7, and after the wheel is in place the key 8 is inserted in the registering keyways of the pinion hub and the spindle. The washer 6ª is put in place, after which the nut 6 is threaded onto the reduced end of the spindle, and the cotter pin 6ᵇ is inserted. When now the cap 20 is secured back in place on the flange 21 the wheel is ready for operation. The ring 9 may be connected to the wheel in any desired manner.

The housing 4ª is connected to the web 12ª to hold the said web and the internal ring fixed, by means of a lug 32 on the housing which enters a socket 33 in the web. It will be understood that the internal gear ring may be connected with the wheel in any desired manner.

I claim:—

1. A draft wheel for motor vehicles, provided with a hub, and with an inwardly extending web at the outer face of the wheel, and having an opening at the axis of the wheel, said web having an outwardly extending externally threaded flange encircling the opening, and the web having bearings spaced apart radially from the axis of the wheel and spaced apart from each other, a second web supported by the first web and spaced apart inwardly therefrom, and having a central opening registering with the opening of the first named web, and having bearings registering with the bearings of the first named web, a journal pin held in each pair of registering bearings, a gear ring adapted to be attached to a fixed support, pinions journaled on the journal pins and meshing with the teeth of the ring, a pinion at the center of the wheel and meshing with the first named pinions, said pinion being adapted to be secured to the spindle of the vehicle, a dust cap threaded onto the flange of the first named web, and a ball bearing arranged between the hub of the last named pinion and the last named web, and between the said hub and the flange of the first named web.

2. A draft wheel for use with motor vehicles, said wheel comprising a rim and an inner ring connected therewith and coaxial with the rim, said ring having at the outer face of the wheel a web provided with an opening at the axis of the wheel and having connected therewith a second web spaced apart inwardly from the first web, and having an opening registering with the opening of the first web, said webs having registering bearings, journal pins in the bearings, an internal gear ring adapted to be secured to a fixed support, pinions on the journal pins meshing with the teeth of the ring, a pinion adapted to be secured to the adjacent spindle, means for holding the pinion in place on the spindle, and a dust cap detachably connected with the first named web and closing the central opening.

NELS LINER OLSON.

Witnesses:
HARRIET WEILAND,
JOSEPH A. SCHULTE.